United States Patent
Moad et al.

(10) Patent No.: US 7,288,585 B2
(45) Date of Patent: Oct. 30, 2007

(54) ACRYLIC DISPERSING AGENTS IN NANOCOMPOSITES

(75) Inventors: Graeme Moad, Sassafras (AU); George Philip Simon, Glenhuntly (AU); Katherine Maree Dean, Collingwood (AU); Guoxin Li, Mulgrave (AU); Roshan Tyrrel Anton Mayadunne, Wheelers Hill (AU); Ezio Rizzardo, Wheelers Hill (AU); Richard Alexander Evans, Glen Waverly (AU); Hendrik Wermter, Bensheim (DE); Rudolf Pfaendner, Rimbach (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 10/561,297

(22) PCT Filed: Jun. 14, 2004

(86) PCT No.: PCT/EP2004/051098

§ 371 (c)(1),
(2), (4) Date: Jun. 9, 2006

(87) PCT Pub. No.: WO2004/113436

PCT Pub. Date: Dec. 29, 2004

(65) Prior Publication Data

US 2006/0235127 A1    Oct. 19, 2006

(30) Foreign Application Priority Data

Jun. 24, 2003    (EP)    .................................. 03405457

(51) Int. Cl.
*C08K 5/10* (2006.01)
*C08K 5/101* (2006.01)

(52) U.S. Cl. .................. 524/315; 524/284; 524/318; 524/445; 524/447; 524/448; 524/449

(58) Field of Classification Search ................ 524/315, 524/284, 318, 445, 447, 448, 449
See application file for complete search history.

(56) References Cited

U.S. PATENT DOCUMENTS

| | | | |
|---|---|---|---|
| 4,581,429 A | 4/1986 | Solomon et al. | 526/220 |
| 5,322,912 A | 6/1994 | Georges et al. | 526/204 |
| 5,912,839 A | 6/1999 | Ovshinsky et al. | 365/185.03 |
| 5,939,184 A | 8/1999 | Inoue et al. | 428/331 |
| 5,973,053 A | 10/1999 | Usuki et al. | 524/445 |
| 6,579,927 B1 | 6/2003 | Fischer | 524/445 |
| 6,648,959 B1 | 11/2003 | Fischer et al. | 106/487 |
| 6,815,489 B1 | 11/2004 | Fischer et al. | 524/447 |
| 6,936,656 B2 | 8/2005 | Mühlebach et al. | 524/560 |
| 2003/0143180 A1 | 7/2003 | Giroud et al. | 424/70.16 |
| 2003/0162878 A1 | 8/2003 | Fischer et al. | 524/445 |
| 2004/0115433 A1 | 6/2004 | Elaissari et al. | 428/407 |

FOREIGN PATENT DOCUMENTS

| | | |
|---|---|---|
| EP | 0 311 723 | 4/1989 |
| EP | 0 311 723 A1 * | 4/1989 |
| EP | 1 167 475 | 1/2002 |
| EP | 1 167 475 A2 * | 1/2002 |
| JP | 2000-345123 | 12/2000 |
| WO | 98/01478 | 1/1998 |
| WO | 99/05099 | 2/1999 |
| WO | 99/31144 | 6/1999 |
| WO | 00/34393 | 6/2000 |
| WO | WO 00/34393 * | 6/2000 |
| WO | 01/48080 | 7/2001 |
| WO | 01/85831 | 11/2001 |
| WO | 02/24759 | 3/2002 |
| WO | 03/004559 | 1/2003 |
| WO | 03/059817 | 7/2003 |
| WO | 2004/041721 | 5/2004 |

OTHER PUBLICATIONS

Clemens Auschra et al., Progress in Organic Coatings, vol. 45, No. 2, pp. 83-93 (2002).
Michael Alexandre et al., Materials Science and Engineering, vol. 28, No. 1-2, pp. 1-63 (2000).
Masaya Kawasumi et al., Macromolecules, vol. 30, No. 20, pp. 6333-6338 (1997).
Dr. Hans Zweifel (Editor), Plastics Additives Handbook, 5th Edition, pp. 901-948 (2001).
Bing Liao et al., Polymer, vol. 42, No. 25, pp. 10007-10011 (2001).
Patent Abstracts of Japan Publication No. 2000-345123, Publication Date: Dec. 12, 2000.

* cited by examiner

*Primary Examiner*—Ling-Sui Choi
(74) *Attorney, Agent, or Firm*—Tyler A. Stevenson

(57) ABSTRACT

The instant invention discloses a composition, preferably a nanocomposite material, comprising (a) a synthetic polymer, (b) a filler such as for example a natural or synthetic phyllosilicate or a mixture of such phyllosilicates, preferably in nanoparticles, and (c) as dispersing agent a polymer based on a long chain alkyl meth(acryte).

18 Claims, No Drawings

ACRYLIC DISPERSING AGENTS IN NANOCOMPOSITES

The present invention relates to a composition, preferably a nanocomposite material, comprising (a) a synthetic polymer, especially a polyolefin, (b) a filler, especially a natural or synthetic phyllosilicate or a mixture of such phyllosilicates, preferably in nanoparticles, and (c) as dispersing agent a polymer based on a long chain alkyl meth(acrylate), preferably a statistical, block or comb copolymer having at least one hydrophilic and at least one hydrophobic segment which is based on a long chain alkyl acrylate. The present invention relates also to a process for the preparation of a synthetic polymer nanocomposite material which comprises melt mixing a mixture of a) a synthetic polymer, b) a filler, and c) as dispersing agent a polymer based on a long chain alkyl meth(acrylate) and to the use of the latter to intercalate and exfoliate a filler and disperse the filler in a synthetic polymer matrix to form a nanocomposite material.

The addition of fillers to organic materials, especially polymers, is known and is described for example in Hans Zweifel (editor), Plastics Additives Handbook, 5th Edition, pages 901-948, Hanser Publishers, Munich 2001. The use of fillers in polymers has the advantage that it is possible to bring about improvement in, for example, the mechanical properties, especially the density, hardness, rigidity (modulus) or reduced shrinkage of the polymer.

Using extremely small filler particles (<200 nm), so-called nano-scaled fillers, mechanical properties, heat distortion temperature stability or flame retardant property of the polymers can be improved at a much lower concentration typically of 2 to 10% by weight compared to 20 to 50% by weight with the micro-scaled normal filler particles. Polymers containing nano-scaled fillers combine favourable mechanical properties like strength, modulus and impact, and show improved surface qualities like gloss, lower tool wear at processing and better conditions for recycling. Coatings and films comprising nano-scaled fillers show improved stability, flame retardance, gas barrier properties and scratch resistance.

Nano-scaled fillers possess an extremely large surface with high surface energy. The deactivation of the surface energy and the compatibilization of the nano-scaled fillers with a polymeric substrate is, therefore, even more important than with a common micro-scaled filler in order to avoid aggregation during processing or conversion of the filled polymer and to reach an excellent dispersion of the nano-scaled filler in the final article.

There is a substantial recent literature on organic-inorganic nanocomposites based on clays or layered silicates such as montmorillonite and synthetic polymers. Polyolefin nanocomposites have been prepared from organic modified days. The clays used are generally modified with alkyl or dialkyl ammonium ions or amines or in a few cases other onium ions, like for example phosphonium. The ammonium ion/amine additives are usually incorporated into the day structure by a separate solution intercalation step.

These conventional organic modified days have a number of disadvantages when used for the preparation of polyolefin nanocomposites. Ammonium salts are thermally unstable at temperatures used in polyolefin processing or may be otherwise reactive under processing conditions. These instabilities result in poor processing stability, inferior mechanical properties, discoloration, odor formation and reduced long-term stability in addition to the formation of volatile by-products.

In order to improve the polyolefin nanocomposite formation by melt processing the use of an additional compatibilizer has been proposed, most often a maleic anhydride grafted polypropylene, which in working examples is present as major component of the final product.

M. Kawasumi et al., Macromolecules 1997, 30, 6333-6338 or U.S. Pat. No. 5,973,053 disclose that a polypropylene nanocomposite is obtained when a day, premodified with octadecylammonium salts, is compounded with polypropylene in the presence of polyolefin oligomers containing polar functionality, for example maleic anhydride grafted polypropylene.

Although compatibilizers can improve the stability of nanocomposites mainly with regard to avoiding agglomeration of the filler, the other weaknesses of the nanocomposites are not improved.

It has now been found that improved synthetic polymer materials with a better long term thermostability, with reduced odor and reduced undesired discoloration, which occurs as a result of the decomposition of the modification agents, can be prepared by the use of a polymer that comprises at least one segment which is based on a long chain alkyl meth(acrylate).

The present invention therefore provides a composition comprising
 a) a synthetic polymer,
 b) a filler, and
 c) as dispersing agent a polymer based on a long chain alkyl meth(acrylate).

Preferably, component (c) is a statistical, block or comb copolymer having at least one segment which is based on a long chain alkyl meth(acrylate).

Of interest is also a composition wherein component (c) is a statistical, block or comb copolymer having at least one hydrophilic and at least one hydrophobic segment which is based on a long chain alkyl acrylate.

Of special interest is a composition wherein component (c) is a statistical, block or comb copolymer having at least 10-100% (mol %) segments based on a long chain alkyl meth(acrylate).

Preferably, component (b) is a filler in nanoparticles (nano-scaled filler or nanoparticulate filler).

Of special interest is a composition wherein component (b) is a nanoparticulate filler which is not organically modified.

Component (c) is suitable for intercalating and exfoliating a filler and disperse the filler in a synthetic polymer matrix, especially a thermoplastic polymer, to form a nanocomposite material.

Examples of such synthetic polymers are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicydopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, heterotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactc, isotactic, hemi-isotactic or atactic; where atactic polymers are preferred. Stereoblock polymers are also included.

7. Graft copolymers of vinyl aromatic monomers such as styrene or (X-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, Ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The synthetic polymers to be protected are preferably thermoplastic polymers, especially polyolefins, polystyrenes, polyamides, polyesters, polyacrylates, most preferably polyolefins, in particular polyethylene and polypropylene or copolymers thereof with mono- and diolefins.

Preferred fillers are for example natural or synthetic phyllosilicates or a mixture of such phyllosilicates. Fillers of special interest are for example layered silicate clays. Of very special interest are compositions comprising as component (b) a montmorillonite, bentonite, beidelite, mica, hectorite, saponite, nontronite, sauconite, vermiculite, ledikite, magadite, kenyaite, stevensite, volkonskoite, hydrotalcite, illite, kaolinite, wollastonite, attapulgite, talc or silica or a mixture thereof.

Component (b) can be unmodified or modified by a modification agent such as, for example, an ammonium, an amine, a phosphonium, sulfonium or silane compound.

Examples of modification agents for nano-clays are for example:

1. Amine and ammonium compounds, for example, distearyidimethylammonium chloride, stearylbenzyldimethylammonium chloride, stearylamine, stearyidiethoxyamine or aminododecanoic acid [commercially available as Nanofil® from Südchemie, Germany]; dimethyl ditallow ammonium, trioctylmethyl ammonium, dipolyoxyethylenealkylmethyl ammonium or polyoxypropylenemethyldiethyl ammonium [commercially available as modified Somasif® from CO-OP Chemical]; octadecylamine, triethoxysilanyl-propylamine [commercially available as Nanomer® from Nanocor], polyalkoxylated ammonium compounds such as for example octadecyl bis(polyoxyethylene[15]amine [Ethomeen® from Eastman] or octadecyl methyl bis(polyoxyethylene[15]ammonium chloride [Etoquad® from Eastman] or just the corresponding free amines.

2. Phosphonium compounds, for example tetrabutylphosphonium or octadecyl triphenyl phosphonium [commercially available from Eastman].

3. Others, for example, triethoxyoctylsilane [commercially available as Nanomer® from Nanocor], ammonium, sulfonium or pyridium compounds as disclosed for example in WO-A-01/04050 or WO-A-99167790; block or graft copolymers such as for example PEO-b-PS or poly-4-vinylpyridine-b-PS; or solvents for swelling such as for example γ-butyrolactone, 2-pyrrolidone, dimethylsulfoxide, diglyme, tetrahydrofuran or furfuryl alcohol.

Compositions which are of interest include those comprising as component (c) an acrylic copolymer. Of special interest are compositions wherein component (c) contains an acrylate or methacrylate comprising at least 8 methylene groups in the side chain. Also of interest are compositions wherein component (c) contains a $C_{12}$-$C_{32}$alkyl meth(acrylate), for example stearyl or octadecyl acrylate (ODA) or methacrylate (ODMA).

Alkyl having between 8 and 32 carbon atoms is a branched or unbranched radical, for example octyl, decyl, 1-methylundecyl, dodecyl, tridecyl, tetradecyl, pentadecyl, hexadecyl, heptadecyl or octadecyl.

Surprisingly, we have found that homopolymers based on long chain (meth)acrylates and their copolymers with short chain (meth)acrylates are effective as well.

An example of a preferred homopolymer is poly(octadecyl acrylate). An example of a preferred copolymer is poly((octadecyl methacrylate)-co-(methyl acrylate)).

Of special interest are compositions comprising as component (c) poly(octadecyl acrylate)-co-(maleic anhydride), poly(octadecyl acrylate)-co-(poly(ethylene glycol)methyl ether acrylate), poly(octadecyl acrylate)-co-(diethylene glycol ethyl ether acrylate), poly(octadecyl acrylate)-co-(N-vinylpyrrolidone), poly(octadecyl methacrylate)-co-(N-vinylpyrrolidone), poly-(octadecyl methacrylate)-co-(maleic anhydride), poly(octadecyl acrylate)-co-(glycidyl acrylate), poly(octadecyl acrylate)-co-(2-dimethylaminoethyl acrylate), poly(octadecyl acrylate)-co-(poly(ethylene glycol)methyl ether acrylate), poly(octadecyl acrylate)-co-(diethylene glycol ethyl ether acrylate), poly(octadecyl acrylate)-co-(methacrylolyoxyethyl phosphate), poly(lauryl acrylate)-co-(maleic anhydride), poly(octadecyl acrylate)-co-(glycidyl methacrylate) or poly(octadecyl acrylate)-co-(methacrylic acid), The statistical, block or comb copolymer having at least one segment which is based on a long chain alkyl meth(acrylate) can be prepared by different methods.

These methods include conventional free radical polymerization and controlled or living free radical polymerization. Such controlled free radical polymerization (CFRP) can preferably occur by four suitable routes:

a1) Polymerization in the presence of alkoxyamine initiator/regulator compounds;
a2) Polymerization in the presence of a stable nitroxyl free radical and a radical initiator (source of free radicals);
a3) Polymerization under atom transfer radical polymerization (ATRP); or
a4) RAFT polymerization which refers to a method of polymer synthesis by radical polymerization using chain transfer agents which react by reversible addition—fragmentation chain transfer.

For example U.S. Pat. No. 4,581,429 or EP-A-0 621 878 discloses the preparation of block copolymers by method a1).

For example WO-A-94/11412 discloses the preparation of block copolymers by method a2).

For example WO-A-01/51534 discloses the preparation of comb copolymers by the ATRP method a3). Kamigaito and Sawamoto in Chemical Reviews 2001, 101, 3689-3745 decribe the preparation of block and other polymers by the ATRP method a3) as well.

For example WO-A-98/01478, WO-A-99/05099 or WO-A-99/31144 disclose the preparation of block copolymers by method a4).

The abovementioned patents are incorporated herein by reference.

An example of the application of Conv (conventional radical polymerization) is decribed in Example 1, an example of the application of NMP [nitroxide mediated polymerization, method a2) to prepare polymers suitable for use in the present invention] is decribed in Example 3, examples of the application of RAFT (polymerization with reversible addition fragmentation chain transfer, method a4) are provided in Examples 2 (random copolymer) and 4 (block copolymer)], an example of the application of Macroinit (conventional polymerization with a macroinitiator) is described in Example 5.

The synthesis of copolymers polymerization can be carried out in emulsion, solution or suspension in either a batch, semi-batch, continuous, or feed mode. In the case of living or controlled radical polymerization block and multi-block and gradient copolymers may be prepared by varying the rate of monomer(s) addition and/or by varying the sequence in which the monomer(s) are added to the polymerization medium. Gradient copolymers may also be prepared in a one-step process by making use of the inherent difference in reactivity of the monomer(s). For gradient block copolymers, it is often desirable to pick comonomers with disparate reactivity ratios. For example, maleic anhydride with styrene or (meth)acrylates.

Preferably, a clay compatible segment is based on one or more monomers which contain polar groups such as for example ether [—O—], amide

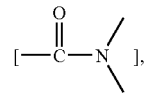

thioamide

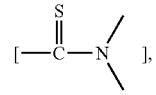

nitrile, hydroxy, amine, pyridine, ammonium and phosphonium in appropriate proximity. It may also be base on reactive monomers containing groups such as anhydride, epoxy or silane.

Preferred reactive monomers are for example PEO acrylate, 1-vinyl-2-pyrrolidinone, N,N-di-methyl acrylamide, acrylonitrile, maleic anhydride, hydroxyethyl acrylate, hydroxypropyl acrylate, tert-butyl α-hydroxymethacrylate, N,N'-dimethylaminoethyl acrylate, 4-vinylbenzyldihydroxyethylamine, 4-vinylpyridine or 4-vinylbenzyltributylphosphonium chloride.

Copolymers of the above polymers with other monomers may also be used.

The polar (hydrophilic) or "clayophilic" segments may also be derived from a polar condensation or other polymers such as for example poly(ethylene oxide). These segments may be incorporated by making an initiator for Conv, ATRP, NMP or RAFT derived from the condensation polymer. The method macroinit provide an example of this approach.

Suprisingly the copolymers are little affected whether the polar segments are introduced as single units (in a statistical copolymer) or as a sequence (in a block copolymer). Polymers prepared by controlled radical polymerization appear slightly more effective than those prepared by conventional polymerization. This may be due to the greater structural regularity (compositional homogeneity and narrower polydispersity) of these copolymers.

Preference is given to compositions comprising as component (c) polymers prepared by controlled or living free radical polymerization. Polymers prepared by controlled or living free radical polymerization are more uniform in composition. It can be ensured that in copolymerization all chains contain the polar (hydrophilic), "clayophilic" or reactive functionality. Polymers prepared by controlled or living free radical polymerization are more uniform in molecular weight distribution.

It is also possible to synthesize copolymers containing long chain acrylates by esterification or transesterification of other acrylic copolymers with a long chain alcohol, for example, dodecyl alcohol or octadecyl alcohol e.g. as disclosed in EP-A-0 386 507.

The statistical, block or comb copolymer having at least one segment which is based on a long chain alkyl acrylate can also be described as polymeric dispersing or solvating agents having amphiphilic properties. They have polar and nonpolar groups in the same molecule and they are, for example, dispersing or solvating agents based on polyethylene glycols (PEG), polyacrylates, polysiloxanes, polyvinyl acetate or on block copolymers containing at least one block copolymer based on acrylate, acrylic acid or methacrylate.

Most preferred copolymers for component (c) are statistical or gradient copolymers of ODA with maleic anhydride, dimethylaminoethyl acrylate, or PEO acrylate.

Preferably, component (b) is present in the composition in an amount of from 0.1 to 40%, in particular 0.5 to 20%, for example from 1 to 10%, based on the weight of the synthetic polymer [component (a)].

Preferably, component (c) is present in the composition in an amount of from 0.1 to 20%, in particular 0.2 to 15%, for example from 0.2 to 10%, based on the weight of the synthetic polymer [component (a)].

Polymer nanocomposites, especially polyolefin nanocomposites, prepared with the preferred additives in the preferred amounts possess improved tensile modulus retained or improved tensile strength and at the same time have a significantly improved elongation at break over systems with nano-filler alone. For example polypropylene nanocomposites according to this invention possess greater ductility than traditional polypropylene nanocomposites prepared with organoclay and polypropylene-graft-maleic anhyfdride additive.

In addition to components (a), (b) and (c) the novel compositions may comprise further additives, such as, for example, the following:

1. Antioxidants 1.1. Alkylated monophenols, for example 2,6-di-tert-butyl-4-methylphenol, 2-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-di-methylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side-chain, e.g. 2,6-dinonyl-methylphenol, 2,4-dimethyl-6-(1'-methylundec-1'-yl)-phenol, 2,4-dimethyl(1'-methylheptadec-1'-yl)-phenol, 2,4-dimethyl-6-(1'-methyltridec-1'-yl)-phenol and mixtures thereof.

1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octa-decyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxy-dibenzyl ether, octadecyl-4-hydroxy-3,5-dimethylbenzyl mercaptoacetate, tridecyl-4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxy-benzyl) sulfide, isooctyl-3,5-di-tert-butyl-4-hydroxybenzyl mercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di-[4-(1,1,3,3-tetramethylbutyl)phenyl]2,2-bis(3,5-di-tert-butyl-4-hydroxybenzyl)malonate.

1.9. Hydroxybenzyl aromatic compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetra-methylbenzene, 2,4,6-tris(3,5-di-tert-butyl 4-hydroxybenzyl)phenol.

1.10. Triazine compounds, for example 2,4-bisoctylmercapto-6-(3,5-di-tert-butyl-4-hydroxy-anilino)-1,3,5-triazine, 2-octylmercapto-4,6-bis(3,5-di-tert-butyl-4-hydroxya-nilino)-1,3,5-tri-azine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzyl-phosphonate, calcium salt of 3,5-di-tert-butyl-4-hydroxybenzyl-phosphonic acid monoethyl ester.

1.12. Acylaminophenols, for example 4-hydroxylauric acid anilide, 4-hydroxystearic acid anilide, N-(3,5-di-tert-butyl-4-hydroxyphenyl)carbamic acid octyl ester.

1.13. Esters of β-(3,5-di-tert-butyl-4-hydroxyphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl) propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide), N,N'-bis[2-(3-[3,5-di-tert-butyl-4-hydroxyphenyl]-propionyloxy)ethyl]oxamide (Naugard® XL-1 from Uniroyal).

1.18. Ascorbic acid (Vitamin C).

1.19. Amine-type antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-se-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyl-diphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]ethane, 1,2-di(phenylamino)propane, (o-tolyl)-biguanide, di[4-(1',3'-dimethylbutyl)phenyl]amine, tert-octylated N-phenyl-1-naphthylamine, mixture of mono- and di-alkylated tert-butyl-/tert-octyl-diphenylamines, mixture of mono- and di-alkylated nonyl-diphenylamines, mixture of mono- and di-alkylated dodecyidiphenylamines, mixture of mono- and di-alkylated isopropyl-/isohexyl-diphenylamines, mixtures of mono- and di-alkylated tert-butyidiphenylamines, 2,3-dihydro-3,3-dimethyl-4H-1,4-benzothiazine, phenothiazine, mixture of mono- and di-alkylated tert-butyl-/tertoctyl-phenothiazines, mixture of mono- and di-alkylated tert-octylphenothiazines, N-allylphenothiazine or N,N,N',N'-tetraphenyl-1,4-diaminobut-2-ene.

2. UV Absorbers and Light Stabilizers 2.1. 2-(2'-Hydroxyphenyl)-benzotriazoles, for example 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, 2-(3'-tert-butyl-2'-hydroxy-5'-(2-isooctyloxycarbonylethyl)-phenyl-benzotriazole, 2,2'-methylenebis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R—CH$_2$CH$_2$—COO—CH$_2$CH$_2$—]$_2$ wherein R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)-phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, for example α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methyl-indoline.

2.5. Nickel compounds, for example nickel complexes of 2,2'-thio-bis[4-(1,1,3,3-tetramethylbutyl)phenol], such as the 1:1 or 1:2 complex, optionally with additional ligands, such as n-butylamine, triethanolamine or N-cyclohexyldiethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

2.6. Sterically hindered amines, for example bis(2,2,6,6-tetramethylpiperid-4-yl) sebacate, bis(2,2,6,6-tetramethylpiperid-4-yl) succinate, bis(1,2,2,6,6-pentamethylpiperid-4-yl) sebacate, bis(1-octyloxy-2,2,6,6-tetramethylpiperid-4-yl) sebacate, n-butyl-3,5-di-tert-butyl-4-hydroxybenzylmalonic acid bis(1,2,2,6,6-pentamethylpiperidyl)ester, condensation product of 1-hydroxyethyl-2,2,6,6-tetramethyl-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-s-triazine, tris(2,2,6,6-tetramethylpiperidyl)nitrilo-triacetate, tetrakis (2,2,6,6-tetramethyl-4-piperidyl)-1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyl-oxy-2,2, 6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro [4.5]decane-2,4-dione, bis(1-octyloxy-2,2,6,6-tetramethylpiperidyl) sebacate, bis(1-octyloxy-2,2,6,6-tetramethylpiperidyl) succinate, linear or cyclic condensation products of N,N'-bis(2,2,6,6-tetramethyl-4-piperidyl)hexamethylenediamine and 4-morpholino-2,6-dichloro-1,3,5-triazine, condensation product of 2-chloro-4,6-di(4-n-butylamino-2,2,6, 6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)-ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis(2,2,6, 6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and 4-butylamino-2,2,6,6-tetramethylpiperidine (CAS Reg. No. [136504-96-6]); condensation product of 1,6-diaminohexane and 2,4,6-trichloro-1,3,5-triazine and N,N-dibutylamine and 4-butyl-amino-2,2,6, 6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride α-olefin copolymer and 2,2,6,6-tetramethyl-4-aminopiperidine or 1,2,2,6,6-pentamethyl-4-aminopiperidine.

2.7. Oxalic acid diamides, for example 4,4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy) phenyl]-4,6-bis(2,4-dimethylphenyl)-1,3,5-triazine, 2-[2-hydroxy-4-(2-hydroxy-3-octyloxypropyloxy)phenyl]4,6-bis (2,4-dimethylphenyl) 1,3,5-triazine, 2-[4-dodecyloxy/ tridecyloxy-2-hydroxypropoxy)-2-hydroxyphenyl]-4,6-bis (2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxalic acid diamide, N-salicylal-N'-salicyloylhydrazine, N,N'-bis (salicyloyl)hydrazine, N,N'-bis(3,5-di-tert-butyl-4-hydroxyphenylpropionyl)-hydrazine, 3-salicyloylamino-1,2,4-triazole, bis(benzylidene)oxalic acid dihydrazide, oxanilide, isophthalic acid dihydrazide, sebacic acid bis-phenylhydrazide, N,N'-diacetyladipic acid dihydrazide, N,N'-bis-salicyloyloxalic acid dihydrazide, N,N'-bis-salicyloylthiopropionic acid dihydrazide.

4. Phosphites and phosphonites, e.g. triphenyl phosphite, diphenylalkyl phosphites, phenyl-dialkyl phosphites, tris (nonylphenyl)phosphite, trilauryl phosphite, trioctadecyl phosphite, distearyl-pentaerythritol diphosphite, tris(2,4-di-tert-butylphenyl)phosphite, diisodecylpentaerythritol diphosphite, bis(2,4-di-tert-butylphenyl)pentaerythritol diphosphite, bis(2,4-di-cumylphenylpentaerythritol diphosphite, bis(2,6-di-tert-butyl-4-methylphenyl)pentaerythritol diphosphite, bis-isodecyloxy-pentaerythritol diphosphite, bis(2,4-di-tert-butyl-4-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methylphosphite, bis(2,4-di-tert-butyl-6-methylphenyl) ethylphosphite, 6-fluoro-2,4,8,10-tetra-tert-butyl-12-methyl-dibenzo[d,g]-1,3,2-dioxaphosphocine, 2,2', 2"-nitrilo[triethyl-tris(3,3',5,5'-tetra-tert-butyl-1,1'-biphenyl-2,2'-diyl)-phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrones derived from N,N-dialkyl-hydroxylamines prepared from hydrogenated tallow fatty amines.

7. Thiosynergistic compounds, for example thiodipropionic acid dilauryl ester or thiodipropionic acid distearyl ester.

8. Peroxide-destroying compounds, for example esters of β-thio-dipropionic acid, for example the lauryl, stearyl, myristyl or tridecyl ester, mercaptobenzimidazole, the zinc salt of 2-mercaptobenzimidazole, zinc dibutyldithiocarbamate, dioctadecyldisulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, for example inorganic substances, e.g. talc, metal oxides, such as titanium dioxide or magnesium oxide, phosphates, carbonates or sulfates of preferably alkaline earth metals; organic compounds, such as mono- or poly-carboxylic acids and their salts, e.g. 4-tert-butylbenzoic acid, adipic acid, diphenylacetic acid, sodium succinate or sodium benzoate; polymeric compounds, for example ionic copolymerisates ("ionomers"). Special preference is given to 1,3:2,4-bis(3',4'-dimethylbenzylidene)sorbitol, 1,3:2,4-di(paramethyldibenzylidene)sorbitol and 1,3:2,4-di(benzylidene)sorbitol.

12. Additional fillers and reinforcing agents, for example calcium carbonate, silicates, glass fibres, glass beads, talc, kaolin, mica, barium sulfate, metal oxides and hydroxides, carbon black, graphite, wood powders, and powders and fibres of other natural products, synthetic fibres.

13. Other additives, for example plasticisers, lubricants, emulsifiers, pigments, rheology additives, catalysts, flow improvers, optical brighteners, flame retardants, antistatics, blowing agents.

14. Benzofuranones and indolinones, for example as described in U.S. Pat. No. 4,325,863; U.S. Pat. No. 4,338,244; U.S. Pat. No. 5,175,312, U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyl-oxyethoxy) phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3, 5-dimethylphenyl)-5,7-di-tert-butyl-benzofuran-2-one, 3-(3, 5-dimethyl-4-pivaloyloxy-phenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one or 3-(2-acetyl-5-isooctylphenyl)-3-isooctylbenzofuran-2-one.

The costabilizers are added, for example, in concentrations of 0.01 to 10%, relative to the total weight of the synthetic polymer to be stabilized.

Preferred further additives are phenolic antioxidants, light-stabilizers, processing stabilizers, solvents, pigments, dyes, plasticizers, compatibilizers, toughening agents, thixotropic agents and/or metal deactivators.

In addition to the nano fillers other fillers may be used as reinforcing agents (item 12 in the list), for example talc, calcium carbonate, hydrotalcite, mica, kaolin, metal hydroxides, especially aluminium hydroxide or magnesium hydroxide. These are added to the synthetic polymers in concentrations, for example, of from 0.01 to 40%, based on the overall weight of the synthetic polymers to be stabilized.

Carbon black as filler is added to the synthetic polymers in concentrations, judiciously, of from 0.01 to 5%, based on the overall weight of the synthetic polymers to be stabilized.

Glass fibers as reinforcing agents are added to the synthetic polymers in concentrations, judiciously, of from 0.01 to 20%, based on the overall weight of the synthetic polymers to be stabilized.

Further preferred compositions comprise in addition to components (a), (b) and (c) further additives as well, especially alkaline earth metal salts of higher fatty acids, for example calcium stearate.

As a conventional stabilizer combination for processing synthetic polymers, for example polyolefins, to form corresponding mouldings, the combination of a phenolic antioxidant with a secondary antioxidant based on an organic phosphite or phosphonite is recommended.

Incorporation of components (b) and (c) and, if desired, further additives into the synthetic polymers is carried out by known methods, for example before or during moulding or else by applying the dissolved or dispersed compounds to the synthetic polymer, if appropriate with subsequent slow evaporation of the solvent.

The present invention also relates to a nanocomposite material in the form of a masterbatch or concentrate comprising component (a) in an amount of from 5 to 90%, component (b) in an amount of from 5 to 80%, and component (c) in an amount of from 1 to 50% by weight.

Components (b) and (c) and, if desired, further additives, can also be added before or during polymerisation or before crosslinking.

Components (b) and (c), with or without further additives, can be incorporated in pure form or encapsulated in waxes, oils or polymers into the synthetic polymer.

Components (b) and (c), with or without further additives, can also be sprayed onto the synthetic polymer. It is able to dilute other additives (for example the conventional additives indicated above) or their melts so that they too can be sprayed together with these additives onto the polymer. Addion by spraying on during the deactivation of the polymerization catalysts is particularly advantageous, it being possible to carry out spraying using, for example, the steam used for deactivation.

In the case of spherically polymerized polyolefins it may, for example, be advantageous to apply components (b) and (c), with or without other additives, by spraying.

The synthetic polymers prepared in this way can be employed in a wide variety of forms, for example as foams, films, fibres, tapes, moulding compositions, as profiles or as binders for coating materials, especially powder coatings, adhesives, putties or especially as thick-layer polyolefin mouldings which are in long-term contact with extractive media, such as, for example, pipes for liquids or gases, films, fibres, geomembranes, tapes, profiles or tanks.

The preferred thick-layer polyolefin mouldings have a layer thickness of from 1 to 50 mm, in particular from 1 to 30 mm, for example from 2 to 10 mm.

The compositions according to the invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film, pipe, profile, bottle, tank or container, fiber containing a composition as described above.

A further embodiment of the present invention relates to a molded article containing a composition as described above. The molding is in particular effected by injection, blow, compression, roto-molding or slush-molding or extrusion.

The present invention also relates to a process for the preparation of a synthetic polymer nanocomposite material which comprises melt mixing a mixture of a) a synthetic polymer, b) a filler, and c) as dispersing agent a polymer which is based on a long chain alkyl meth(acrylate).

The melt mixing can be carried out in any heatable container equipped with a stirrer, for example in a closed apparatus such as a kneader, mixer or stirred vessel. The incorporation is preferably carried out in an extruder or in a kneader. It is immaterial whether processing takes place in an inert atmosphere or in the presence of oxygen.

The addition of components (a), (b) and (c) can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing. Particularly preferred processing machines are single-screw extruders, contrarotating and corotating twin-screw extruders, planetary-gear extruders, ring extruders or co-kneaders. It is also possible to use processing machines provided with at least one gas removal compartment to which a vacuum can be applied. Suitable extruders and kneaders are described, for example, in Handbuch der Kunststoffextrusion, Vol. 1, Grundlagen, Editors F. Hensen, W. Knappe, H. Potente, 1989, pp. 3-7, ISBN:3-446-143394; and Vol. 2 Extrusionsanlagen 1986, ISBN 3-446-14329-7. For example, the screw length is 1-60 screw diameters, preferably 35-48 screw diameters. The rotational speed of the screw is preferably 10 to 600 rotations per minute (rpm), for example 25-300 rpm. The maximum throughput is dependent on the screw diameter, the rotational speed and the driving force. The process of the present invention can also be carried out at a level lower than maximum throughput by varying the parameters mentioned or employing weighing machines delivering dosage amounts. If a plurality of components are added, these can be premixed or added individually.

Also of interest is a process for the preparation of a synthetic polymer nanocomposite material, wherein the melt mixing of the components (synthetic polymer, filler and dispersing agent prepared by controlled free radical polymerization) occurs between 120 and 290° C., preferably between 140 and 250° C., for example between 170 and 230° C.

The present invention also relates to synthetic polymer nanocomposites obtained by the above mentioned process.

The preferred components (b) and (c), and optionally further additives, in the process for the preparation of a synthetic polymer nanocomposite material are the same as those described for the composition.

A preferred embodiment of the present invention is also the use of a polymer based on a long chain alkyl meth (acrylate) to intercalate and exfoliate a filler and disperse the filler in a synthetic polymer matrix to form a nanocomposite material.

The preferred dispersing agent, filler and synthetic polymer, and optionally further additives, for this use are the same as those described for the composition.

The following examples illustrate the invention further. Parts or percentages relate to weight.

Gel permeation chromatography (GPC) is performed on a Waters Associates liquid chromatograph equipped with differential refractometer and a set of four 600 mm×7.56 mm columns comprising three PLgel 5μ mixed C columns and one PLgel 3μ mixed E column (Polymer Laboratories). Tetrahydrofuran (flow rate of 1.0 mL/min) is used as eluent at 22±2° C. The columns are calibrated with narrow polydispersity polystyrene standards (Polymer Laboratories) and GPC molecular weights are given as polystyrene equivalents.

EXAMPLE 1

Preparation of Acrylic Random Copolymers by Conventional Radical Polymerization (Conv)

a) Preparation of poly((octadecyl acrylate)-co-(dimethylaminoethyl acrylate)) (PODA-co-DMAEA).

A solution of 300 g (924.4 mmol) of octadecyl acrylate, 33.3 g (232.8 mmol) of 2-(N,N-dimethylamino)ethyl acrylate and 10.95 g (66.7 mmol) of AIBN (azaisobutyronitrile) in 400 ml of dry toluene is degassed by purging argon for 3 hours. Polymerization is carried out at 60° C. with stirring under argon for 67.5 hours. The reaction solution is precipitated into vigorously stirred acetone (2.5 L). The polymer is collected by filtration and vacuum-dried for two days (light yellow solid; $^1$H NMR: conversion 100%; GPC: $M_n$ 22990, $M_w/M_n$ 3.7).

b) Preparation of poly((octadecyl acrylate)-co-(maleic anhydride)) (PODA-co-MAH).

A solution (A) of stearyl acrylate (ODA, 300.0 g, 0.924 mol), maleic anhydride (MAH, 45 g, 0.46 mol) and AIBN (2.7 g. 16.5 mmol) in 930 mL of dry THF and a solution (B) of stearyl acrylate (150 g, 0.46 mol) and AIBN (1.35 g, 8.26 mmol) in 320 mL of dry THF are degassed by purging with argon, combined with vacuum. Solution A is heated and stirred at 70° C. under argon for 2 hours, then, solution B is transferred to solution A by cannula. After the addition, the mixture is heated and stirred at same temperature for a total time of 24 hours. The polymer solution is precipitated into acetone (6 L) and the resultant polymer is collected by filtration and dried in a vacuum oven for two days. (white solid; $^1$HNMR: conversion 96.3% for ODA and 100% for MAH; GPC: $M_n$ 4200, $M_w/M_n$ 1.49).

c) Preparation of poly((octadecyl acrylate)-co-(N-vinylpyrrolidone)) (PODA-co-NVP).

A solution (A) of stearyl acrylate (ODA, 50.0 g, 0.154 mol), N-vinyl pyrrolidone (NVP, 4.28 g, 0.0385 mol) and AIBN (1.78 g, 10.8 mmol) in dry toluene (400 mL) and a solution (B) of stearyl acrylate (450 g, 1.387 mol), N-vinyl pyrrolidone (38.5 g, 0.347 mol) and AIBN (16.04 g. 97.69 mmol) in dry toluene (600 mL) are degassed by purging with argon, combined with vacuum. Solution A is first heated and stirred at 100° C. under argon for 40 minutes, then aliquots (171, 233, 317 mL and remainder of solution) are added by syringe at 40 minute intervals. After addition, the mixture is heated and stirred at same temperature for further 40 minutes. The total polymerization time is 4.5 hours. The polymer solution is precipitated into acetone (6 L) and the resultant polymer is collected by filtration and dried in a vacuum oven for three days. (white solid; $^1$H NMR: conversion 99% for ODA and 100% for NVP; GPC: $M_n$ 9300, $M_w/M_n$ 1.47).

d) Preparation of poly((octadecyl methacrylate)-co-(N-vinylpyrrolidone)) (PODMA-co-NVP).

A solution of 404 g (1190 mmol) of octadecyl methacrylate, 33.2 g (298 mmol) of N-vinyl pyrrolidone, 7.9 g (87.4 mmol) of 1-butanethiol and 1.44 g (8.74 mmol) of AIBN (azaisobutyronitrile) in 1000 ml of dry toluene is degassed by purging with argon for 3 hours. Polymerization is carried out at 60° C. with stirring under argon for 63.0 hours. The resultant solution is precipitated into vigorously stirred acetone (5.0 L). The polymer is collected by filtration and vacuum-dried for two days (white solid, $^1$H NMR: conversion 100% for ODMA and 48% for NVP; GPC: $M_n$ 6000, $M_w/M_n$ 1.48).

e) Preparation of poly((octadecyl acrylate)-co-(N-vinylpyrrolidone)) (PODA-co-NVP).

A solution (A) of octadecyl acrylate (ODA, 500 g, 1.54 mol), N-vinyl pyrrolidone (NVP, 42.8 g, 0.385 mol) and AIBN (0.87 g. 5.3 mmol) in 1000 mL of dry toluene (solution A) and a solution (B) of AIBN (17 g, 103.3 mmol) in 260 mL of dry toluene are degassed by purging with argon, combined with vacuum. Solution A is first heated and stirred at 110° C. under argon for 20 minutes, then, solution B is added by syringe in 20 ml aliquots at 5 minute intervals. When the addition is complete, the mixture is heated and stirred at same temperature for a further 14 hours. The total polymerization time is 15.5 hours. The polymer solution is precipitated into acetone (6 L) and the resultant polymer is filtered and dried in a vacuum oven for three days. (white solid; $^1$H NMR: conversion 100% for both ODA and NVP; GPC: $M_n$ 24900, $M_w/M_n$ 5.07).

TABLE 1

Polymers prepared by conventional radical polymerization

| Polymer[1] | Prepared by[2] | DP(1)[3] | DP(2)[3] | $M_n$[4] | $M_w/M_n$[5] |
|---|---|---|---|---|---|
| 1a) PODA-co-MAH | Conv | 4.0 | 1.0 | 7030 (4100) | — |
| 1b) PODA-co-PEGMEA | Conv | 14.7 | 4.9 | 7400 (6100) | 1.2 |
| 1c) PODA-co-DMAEA | Conv | 4.0 | 1.0 | (23000) | 3.7 |
| 1d) PODA-co-BA-co-DMAEA | Conv | 2.0/6.0 | 2.0 | (8800) | 10.8 |
| 1e) PODA-co-BA-co-MAH | Conv | 2.0/6.0 | 2.0 | (4550) | 3.1 |
| 1f) PODA-co-DEGEEA | Conv | 4.0 | 1.0 | insol. | insol. |
| 1g) PODA-co-PEGMEA | Conv | 4.0 | 1.0 | (4300) | 1.7 |
| 1h) PODA-co-MAH | Conv | 3.0 | 1.0 | (5200) | 2.32 |
| 1i) PODA-co-MAH | Conv | 5.0 | 1.0 | (6100) | 2.70 |
| 1j) PODA-co-MAH | Conv1 | 3.0 | 1.0 | (4200) | 1.49 |
| 1k) PODA-co-NVP | Conv5 | 4.0 | 1.0 | NA | NA |
| 1l) PODA-co-NVP | Conv4 | 4.0 | 1.0 | (24900) | 5.07 |
| 1m) PODMA-co-NVP | Conv3 | 4.0 | 1.0 | (6000) | 1.48 |
| 1n) PODA-co-NVP | Conv3 | 4.0 | 1.0 | (49800) | 3.84 |
| 1o) PODMA-co-MAH | Conv3 | 3.0 | 1.0 | (5100) | 1.55 |
| 1p) PODA-co-NVP | Conv2 | 4.0 | 1.0 | (9300) | 1.47 |

TABLE 1-continued

| Polymers prepared by conventional radical polymerization | | | | | |
|---|---|---|---|---|---|
| Polymer[1] | Prepared by[2] | DP(1)[3] | DP(2)[3] | $M_n$[4] | $M_w/M_n$[5] |
| 1q) PODA-co-GA | Conv | 4.0 | 1.0 | (48300) | 5.08 |
| 1r) PODMA-co-NVP | Conv3 | 4.0 | 1.0 | (18700) | 1.73 |

[1]Abbreviations:
PODA-co-MAH is poly(octadecyl acrylate)-co-(maleic anhydride),
PODA-co-PEGMEA is poly(octadecyl acrylate)-co-(poly(ethylene glycol) methyl ether acrylate),
PODA-co-DMAEA is poly(octadecyl acrylate)-co-(2-dimethylaminoethyl acrylate),
PODA-co-BA-co-DMAEA is poly(octadecyl acrylate)-co-(butyl acrylate)-(2-dimethylaminoethyl acrylate),
PODA-co-BA-co-MAH is poly(octadecyl acrylate)-co-(butyl acrylate)-co-(maleic anhydride),
PODA-co-DEGEEA is poly(octadecyl acrylate)-co-(diethylene glycol ethyl ether acrylate),
PODA-co-NVP is poly(octadecyl acrylate)-co-(N-vinylpyrrolidone),
PODMA-co-NVP is poly(octadecyl methacrylate)-co-(N-vinylpyrrolidone),
PODMA-co-MAH is poly(octadecyl methacrylate)-co-(maleic anhydride),
PODA-co-GA is poly(octadecyl acrylate)-co-(glycidyl acrylate),
[2]Method of synthesis:
Conv Conventional radical polymerization with AIBN initiator as disclosed for example in Example 1a.
Conv1 Conventional radical polymerization with AIBN initiator and portionwise addition of monomers as disclosed for example in Example 1b.
Conv2 Conventional radical polymerization with AIBN initiator and portionwise addition of monomers as disclosed for example in Example 1c.
Conv3 Conventional radical polymerization with AIBN initiator and butanethiol transfer agent as disclosed for example in Example 1d.
Conv4 Conventional radical polymerization with AIBN initiator as disclosed for example in Example 1e.
Conv5 Conventional radical polymerization with AIBN initiator as disclosed for example in Example 1a but with a reaction temperature of 70° C.
[3]DP1 and DP2 indicate the overall composition and represent average ratio of the comonomers in the polymer chain.
[4]Molecular weight obtained from $^1$H NMR integration, the values in parentheses are from GPC.
[5]Polydispersity of polymer obtained from GPC.

EXAMPLE 2

Preparation of Acrylic Statistical Copolymers by RAFT Polymerization (RAFT)

Preparation of poly((octadecyl acrylate)-co-(dimethylaminoethyl acrylate) PODA-co-DMAEA.

A solution of 200 g (616 mmol) of octadecyl acrylate, 22.1 g (154 mmol) of 2-(N,N-dimethylamino)ethyl acrylate, 12.0 g (44.4 mmol) of butyl 1-phenylethyl trithiocarbonate and 729 mg (4.44 mmol) of AIBN in 300 mL of dry toluene is degassed by purging argon for 3 hours. Polymerization is carried out at 60° C. with stirring under argon for 24 hours. The reaction solution was precipitated into vigorously stirred acetone (2.5 L). The polymer is collected by filtration and vacuum-dried for two days (yellow solid; $^1$H NMR: conversion 95.1%; GPC: $M_n$ 5590, $M_w/M_n$ 1.1).

TABLE 2

| Copolymers prepared by RAFT polymerization | | | | | |
|---|---|---|---|---|---|
| Polymer[1] | Prepared by[2] | DP(1)[3] | DP(2)[3] | $M_n$[4] | $M_w/M_n$[5] |
| 2a) PODA-co-DMAEA | RAFT | 30.0 | 7.0 | 11000 (13700) | 1.2 |
| 2b) PODA-co-PEGMEA | RAFT | 26.1 | 6.6 | 11500 (8800) | 1.2 |
| 2c) PODA-co-NVP | RAFT | 53.1 | 14.2 | 19250 (16200) | 1.23 |
| 2d) PODA-co-DMAEA | RAFT | 12.3 | 3.1 | 4700 (5600) | 1.08 |
| 2e) PODA-co-MAH | RAFT3 | 4.4 | 13.6 | 15000 (6300) | 1.29 |
| 2f) PODA-co-MMA-co-MAH | RAFT3 | 11.0/2.0 | 2.0 | 4300 (5300) | 1.13 |
| 2g) PODA-co-DEGEEA | RAFT3 | 12.5 | 1.4 | 4700 (5900) | 1.06 |
| 2h) PODA-co-DMAEA | RAFT3 | 12.5 | 1.4 | 4600 (5800) | 1.07 |
| 2i) PODA-co-DMAEA | RAFT3 | 96.7 | 10.8 | 33500 (34900) | 1.14 |
| 2j) PODA-co-MAH | RAFT3 | 38.5 | 9.0 | 13800 (10400) | 1.28 |
| 2k) PODA-co-MAH | RAFT3 | 50 | 7.0 | 17300 (7200) | 1.27 |
| 2l) PODA-co-MAH | RAFT3 | 45.5 | 2.3 | 15400 (8000) | 1.32 |
| 2m) PODA-co-MEP | RAFT3 | 43.6 | 1.53 | 14900 (8400) | 1.41 |
| 2n) PLA-co-MAH | RAFT3 | 69.0 | 21.0 | 18900 (4000) | 1.62 |
| 2o) PODA-co-GMA | RAFT3 | 54.8 | 15.1 | 20300 (15600) | 1.29 |
| 2p) PODA-co-MAA | RAFT3 | 10.0 | 1.0 | (14500) | 1.21 |
| 2q) PODA-co-MAA | RAFT3 | 5.0 | 1.0 | (13900) | 1.21 |

TABLE 2-continued

Copolymers prepared by RAFT polymerization

| Polymer[1] | Prepared by[2] | DP(1)[3] | DP(2)[3] | $M_n$[4] | $M_w/M_n$[5] |
|---|---|---|---|---|---|
| 2r) PODA-co-MA-co-MAA | RAFT3 | 9.0/1.0 | 1.0 | (14900) | 1.21 |
| 2s) PODA-co-MAH-co-AA | RAFT3 | 9.0 | 1.0/1.0 | (12800) | 1.18 |

[1]Abbreviations:
PODA-co-DMAEA is poly(octadecyl acrylate)-co-(2-dimethylaminoethyl acrylate),
PODA-co-PEGMEA is poly(octadecyl acrylate)-co-(poly(ethylene glycol) methyl ether acrylate),
PODA-co-NVP is poly(octadecyl acrylate)-co-(N-vinylpyrrolidone),
PODA-co-MAH is poly(octadecyl acrylate)-co-(maleic anhydride),
PODA-co-MMA-co-MAH is poly(octadecyl acrylate)-co-(methyl methacrylate)-co-(maleic anhydride),
PODA-co-DEGEEA is poly(octadecyl acrylate)-co-(diethylene glycol ethyl ether acrylate),
PODA-co-MEP is poly(octadecyl acrylate)-co-(methacrylolyoxyethyl phosphate),
PLA-co-MAH is poly(lauryl acrylate)-co-(maleic anhydride),
PODA-co-GMA is poly(octadecyl acrylate)-co-(glycidyl methacrylate),
PODA-co-MAA is poly(octadecyl acrylate)-co-(methacrylic acid), acid),
PODA-co-PMA-co-MAA is poly(octadecyl acrylate)-co-(methyl acrylate)-co-(methacrylic acid)
PODA-co-MAH-co-AA is poly(octadecyl acrylate)-co-poly(maleic anhydride)-co-(acrylic acid)
[2]Method of synthesis:
RAFT Polymerization with reversible addition fragmentation chain transfer as disclosed for example in Example 2 (random copolymer) or 4 (block copolymer).
RAFT3 Polymerization with reversible addition fragmentation chain transfer as disclosed for example in Example 4 but with S-dodecyl S-(1-phenylethyl) trithiocarbonate as RAFT agent.
[3]DP1 and DP2 indicate the overall composition and represent average ratio of the comonomers in the polymer chain.
[4]Molecular weight obtained from $^1$H NMR integration, the values in parentheses are from GPC.
[5]Polydispersity of polymer obtained from GPC.

EXAMPLE 3

Preparation of Acrylic Block Copolymers by Nitroxide Mediated Polymerization (NMP). The Preparation of the Compound of the Formula NMP-1

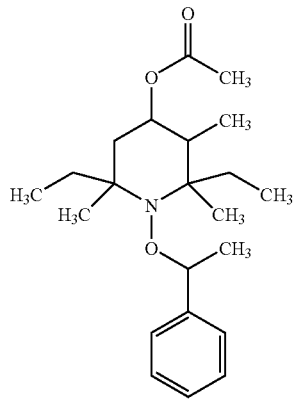

(NMP-1)

is disclosed in Example 1 of GB-A-2 361 235.

a) Preparation of poly(octadecyl acrylate) (PODA).

A mixture of 103.1 g (317.7 mmol) of octadecyl acrylate and 5.55 g (15.4 mmol) of the compound of the formula NMP-1 [preparation disclosed in Example 1 of GB-A-2 361 235] is de-gassed by three freeze-evacuate-thaw cycles. The mixture is heated in an oil bath with stirring at 120° C. under argon for 48 hours. The polymer is diluted with 60 ml of toluene and precipitated into ethanol (800 mL at 35° C.), filtered, washed with ethanol and dried at room temperature in a vacuum oven for 48 hours (white solid; $^1$HNMR: conversion 74.6%, $M_n$ 4800; GPC: $M_n$ 6310 $M_w/M_n$ 1.2).

b) Preparation of poly(octadecyl acrylate)-block-poly(2-(N,N-dimethylamino)ethyl acrylate). (PODA-b-PDMAEA)

A solution of 15 g (3.14 mmol) of poly(octadecyl acrylate) [prepared according to Example 3a] and 7 g (48.8 mmol) of 2-(N,N-dimethylamino)ethyl acrylate in dry toluene (25 mL) in a bulb ampoule is degassed by freeze-thaw method. The sealed ampoule is placed in an oil bath at 120° C. for 42.5 hours. The polymer is precipitated into vigourously stirred methanol (400 mL). The solid is filtered, washed with methanol and dried at 35° C. in a vacuum oven overnight (white solid; $^1$H NMR: conversion 41.2%, $M_n$ 5700; GPC: $M_n$ 7200 $M_w/M_n$ 1.2).

TABLE 3

PODA and block copolymers prepared by nitroxide mediated polymerization

| Polymer[1] | Prepared by[2] | DP(1)[3] | DP(2)[4] | $M_n$[5] | $M_w/M_n$[6] |
|---|---|---|---|---|---|
| 3a) PODA | NMP | 12.3 | | 4400 (4800) | 1.3 |
| 3b) PODA-b-PVP | NMP | 15.6 | 6.2 | 6100 | — |
| 3c) PODA-b-PEGMEA | NMP | 15.6 | 5.6 | 7960 | — |
| 3d) PODA-b-HEA | NMP | 19.5 | 8.3 | 7700 | 1.3 |
| 3e) PODA-b-DMAEA | NMP | 13.6 | 6.4 | 5700 (7200) | 1.2 |
| 3f) PODA-b-HEA | NMP | 19.5 | 8.3 | 7700 | 1.3 |
| 3g) PODA-b-AN | NMP | 17.1 | 21.0 | 7700 | — |

TABLE 3-continued

PODA and block copolymers prepared by nitroxide mediated polymerization

| Polymer[1] | Prepared by[2] | DP(1)[3] | DP(2)[4] | $M_n$[5] | $M_w/M_n$[6] |
|---|---|---|---|---|---|
| 3h) PODA-b-VP | NMP | 15.6 | 6.2 | 6100 | — |
| 3i) PODA-b-DMA | NMP | 20.0 | 7.7 | 7600 | — |

[1]Abbreviations:
PODA is poly(octadecyl acrylate),
PODA-b-VP is poly(octadecyl acrylate)-block-poly(N-vinylpyridine),
PODA-b-PEGMEA is poly(octadecyl acrylate)-block-poly(poly(ethylene glycol) methyl ether acrylate),
PODA-b-HEA is poly(octadecyl acrylate)-block-poly(2-hydroxyethyl acrylate),
PODA-b-DMAEA is poly(octadecyl acrylate)-block-poly(2-dimethylaminoethyl acrylate),
PODA-b-AN is poly(octadecyl acrylate)-block-poly(acrylonitrile),
PODA-b-DMA is poly(octadecyl acrylate)-block-poly(N,N-dimethylacrylamide),
[2]Method of synthesis:
NMP is nitroxide mediated polymerization as disclosed for example in Example 3.
[3]Degree of polymerization of first block.
[4]Degree of polymerization of second block.
[5]Molecular weight obtained from $^1$H NMR integration, the values in parentheses are from GPC.
[6]Polydispersity of polymer obtained from GPC.

EXAMPLE 4

Preparation of Acrylic Block Copolymers by RAFT a) Preparation of poly(octadecyl acrylate) (PODA).

A solution of 200 g (616 mmol) of octadecyl acrylate, 12.0 g (44.4 mmol) of S-butyl S'-phenylethyl trithiocarbonate and 729 mg (4.44 mmol) of AIBN in 250 ml of dry toluene is de-gassed by purging Argon for 3 hours. Polymerization is carried out at 60° C. for 20 hours with stirring under argon ($^1$HNMR: conversion 94.4%; GPC: Mn 5170, Mw/Mn 1.1).

b) Preparation of poly(octadecyl acrylate)-block-poly(dimethylaminoethyl acrylate) (PODA-b-DMAEA).

A solution of 22.1 g (154 mmol) of 2-(N,N-dimethylamino)ethyl acrylate and 364 mg (2.22 mmol) of AIBN in 50 ml of dry toluene is degassed by purging Argon for 3 hours. This solution is added to above solution [Example 4a] by syringe. The mixture is stirred at 60° C. under argon for 22 hours. The reaction mixture is precipitated into vigorously stirred acetone (2.5 L). The polymer is collected by filtration and vacuum-dried for two days. (yellow solid; $^1$HNMR: total conversion 97.5%; GPC: Mn 5400, Mw/Mn 1.1).

TABLE 4

PODA and block copolymers prepared by RAFT polymerisation

| Polymer[1] | Prepared by[2] | DP(1)[3] | DP(2)[4] | $M_n$[5] | $M_w/M_n$[6] |
|---|---|---|---|---|---|
| 4a) PODA | RAFT | 14.8 | — | 5200 | — |
| 4b) PODA-b-NVP | RAFT2 | 21.6 | 2.9 | 7700 | — |
| 4c) PODA-b-DMAEA 5000 | RAFT | 14.8 | 3.7 | 5600 (5400) | 1.09 |
| 4d) PODA-b-DMAEA 15000 | RAFT | 41.7 | 8.5 | 14800 (15600) | 1.21 |
| 4e) PODA-b-(PMMA-co-MAH)[7] | RAFT3 | 6.0/1.0 | 1.0 | (5800) | 1.14 |
| 4f) PODA-b-DMAEA[7] | RAFT3 | 10.0 | 1.0 | 4200 (5900) | 1.08 |
| 4g) PODA-b-(PMA-co-MAA)[7] | RAFT3 | 9.0 | 1.0/1.0 | (13500) | 1.21 |
| 4h) PODA-b-(PMAH-co-AA)[7] | RAFT3 | 9.0 | 1.0/1.0 | (12500) | 1.28 |

[1]Abbreviations:
PODA-b-NVP is poly(octadecyl acrylate)-block-poly(N-vinylpyrrolidone),
PODA-b-DMAEA is poly(octadecyl acrylate)-block-poly(2-dimethylaminoethyl acrylate),
PODA-b-(PMMA-co-MAH) is poly(octadecyl acrylate)-block-poly(methyl methacrylate)-co-(mmaelic anhydride),
PODA-b-(PMA-co-MAA) is poly(octadecyl acrylate)-block-poly(methyl acrylate)-co-(methacrylic acid),
PODA-b-(PMAH-co-AA) is poly(octadecyl acrylate)-block-poly(maleic anhydride)-co-(acrylic acid),
[2]Method of synthesis:
RAFT Polymerization with reversible addition fragmentation chain transfer as disclosed for example in Example 2 (random copolymer) or 4 (block copolymer).
RAFT2 Polymerization with reversible addition fragmentation chain transfer as disclosed for example in Example 4 but with O-pentafluorophenyl S-benzyl xanthate as RAFT agent.
RAFT3 Polymerization with reversible addition fragmentation chain transfer as disclosed for example in Example 4 but with S-dodecyl S-(1-phenylethyl) trithiocarbonate as RAFT agent.
[3]Degree of polymerization of first block.
[4]Degree of polymerization of second block.
[5]Molecular weight obtained from $^1$H NMR integration, the values in parentheses are from GPC.
[6]Polydispersity of polymer obtained from GPC.
[7]In case of a statistical or gradient copolymer block the two numbers indicate the overall degrees of polymerization and represent average ratio of the comonomers in the polymer chain.

EXAMPLE 5

Preparation of Acrylic Block Copolymers Using a Macroinitiator a) Preparation of poly((ethylene glycol)methyl ether)-block-poly(octadecyl acrylate).

A solution of 6.29 g (3.78 mmol) of an azo-macroinitiator [prepared according to a procedure of Rentsch and Schultz, Makromol. Chem. 1977, 178, 2535 with polyethylene glycol mono-methyl ether MW 750] and 21.14 g (65.1 mmol) of octadecyl acrylate in 15 ml of dry toluene in an ampoule is degassed by three freeze-pump-thaw cycles. The sealed ampoule is placed in an oil bath at 120° C. for 2 hours. The polymer solution is precipitated into 300 ml of methanol. The solid is collected by filtration, washed twice with methanol (20 ml) and dried in vacuum oven for two days. The yield of the polymer is 22.4 g (76%). GPC Mn 8900; Mw/Mn 5.9.

TABLE 5

Block copolymers prepared using macroinitiator

| Polymer[1] | Prepared by[2] | DP(1)[3] | DP(2)[4] | $M_n$[5] | $M_w/M_n$[6] |
|---|---|---|---|---|---|
| 5a) PODA-b-PEO750 | macroinit | 16.0 | 26.4 | 9400 (8900) | 5.9 |
| 5b) PODA-b-PEO1000 | macroinit | 22.0 | 38.2 | 13500 (6500) | 1.9 |

[1]Abbreviations:
PODA-b-PEO750 is poly(octadecyl acrylate)-block-poly(ethylene glycol) (PEG MW 750),
PODA-b-PEO1000 is poly(octadecyl acrylate)-block-poly(ethylene glycol) (PEG MW 1000),
[2]Method of synthesis:
Macroinit is conventional polymerization with macroinitiator as disclosed for example in Example 5.
[3]Degree of polymerization of first block.
[4]Degree of polymerization of second block.
[5]Molecular weight obtained from $^1$H NMR integration, the values in parentheses are from GPC.
[6]Polydispersity of polymer obtained from GPC.

EXAMPLE 6

Preparation of poly(octadecyl acrylate)-block-poly (4-vinylbenzyltriethylammonium chloride) (PODA-b-VBTEAC)

A solution of 2.0 g (3.28 mmol VBC) of P(ODA-bl-VBC) and 1.77 g (17.4 mmol) of triethylamine in 10 ml of toluene is stirred at 90° C. for 48 hours. The solvent and unreacted triethylamine are removed under vacuum. The extent of quaternization from NMR is 71.86%. $^1$H NMR (CDCl$_3$): δ4.0 (OCH$_2$ from ODA unit), δ3.4 (NCH$_2$ from 4-vinylbenzyltriethylammonium chloride unit).

TABLE 6

Copolymers prepared by RAFT or NMP polymerization and quaternized

| Polymer[1] | Prepared by[2] | DP(1)[3] | DP(2)[4] | $M_n$[5] | $M_w/M_n$[6] |
|---|---|---|---|---|---|
| 6a) PODA-b-VBTEAC | NMP Q | 19.5 | 10.5 | 10000 | — |
| 6b) PODA-b-VBTBPC | NMP Q | 19.5 | 14.6 | — | — |
| 6c) PODA-b-VBDHEA | NMP Q | 19.5 | 8.4 | 9800 | — |
| 6d) PODA-co-AETMAI[7] | RAFT3 Q | 15.5 | 3.8 | 6000 (6300) | 1.06 |
| 6e) PODA-co-AEBDMAB[7] | RAFT3 Q | 13.4 | 3.4 | 5200 (6300) | 1.09 |
| 6f) PODA-co-AEDMAC[7] | RAFT3 Q | 14.5 | 3.6 | 5600 (6500) | 1.13 |
| 6g) PODA-b-AEBDMAB | RAFT3 Q | 12.9 | 3.2 | 5200 (5100) | 1.06 |
| 6h) PODA-b-AETMAI | RAFT3 Q | 14.7 | 2.2 | 5800 (5100) | 1.06 |
| 6i) PODA-co-AEBDMAB[7] | RAFT3 Q | 12.5 | 1.4 | (5700) | 1.06 |
| 6j) PODA-b-AEBDMAB | RAFT3 Q | 11.4 | 1.3 | 4500 (5700) | 1.07 |
| 6k) PODA-co-AEBDMAB[7] | RAFT3 Q | 98.5 | 10.9 | 35500 (8700) | 1.37 |

[1]Abbreviations:
PODA-b-VBTEAC is poly(octadecyl acrylate)-block-poly(4-vinylbenzyltriethylammonium chloride),
PODA-b-VBTBPC is poly(octadecyl acrylate)-block-poly(4-vinylbenzyltributylphosphonium chloride),
PODA-b-VBDHEA is poly(octadecyl acrylate)-block-poly(4-vinylbenzydi(hydroxyethyl)ammonium chloride),
PODA-co-AETMAI is poly(octadecyl acrylate)-co-(acryloyloxyethyl trimethyl ammonium iodide),
PODA-co-AEBDMAB is poly(octadecyl acrylate)-co-(acryloyloxyethyl butyl dimethyl ammonium bromide),
PODA-co-AEDMAC is poly(octadecyl acrylate)-co-(acryloyloxyethyl dimethyl ammonium chloride),
PODA-b-AEBDMAB is poly(octadecyl acrylate)-block-poly(acryloyloxyethyl butyl dimethyl ammonium bromide),
PODA-b-AETMAI is poly(octadecyl acrylate)-block-poly(acryloyloxyethyl trimethyl ammonium iodide),
[2]Method of synthesis:
Copolymers were prepred by one of the following routes
NMP is nitroxide mediated polymerization as disclosed for example in Example 3.

TABLE 6-continued

Copolymers prepared by RAFT or NMP polymerization and quaternized

| Polymer[1] | Prepared by[2] | DP(1)[3] | DP(2)[4] | $M_n$[5] | $M_w/M_n$[6] |
|---|---|---|---|---|---|

RAFT3 is polymerization with reversible addition fragmentation chain transfer as disclosed for example in Example 4 but with S-dodecyl S-(1-phenylethyl) trithiocarbonate as RAFT agent and then quaternized as disclosed for example in Example 6.
[3] Degree of polymerization of first block.
[4] Degree of polymerization of second block.
[5] Molecular weight obtained from $^1$H NMR integration, the values in parentheses are from GPC.
[6] Polydispersity of polymer obtained from GPC.
[7] In case of statistical or gradient copolymers DP1 and DP2 indicate the overall composition and represent average ratio of the comonomers in the polymer chain.

EXAMPLE 7

Preparation of Polypropylene Nanocomposites in a Batch Mixer Based on Unmodified Sodium Montmorillonite 50 g of polypropylene [Basell KY 6100®], is blended with 0.25% of Irganox 1010® (pentaerythritol tetrakis[3-(3,5-di-tert-butyl-4-hydroxyphenyl)propionate]) and 0.25% of Irgafos 168® (tris(2,4-di-tert-butylphenyl) phosphite), 5% of a montmorillonite clay [Cloisite (Na$^+$)® obtained from Southern Clay Industries] and 2.5% of a dispersing agent according to Table 7 in a plastic cup and then added to a batch mixer operating at 25 rpm and 180° C., the mixture is then taken to 50 rpm for 10 minutes. Small scale injection moulding is performed with a CS-183 MMX Minimax moulder. The mixing chamber is pre-heated to 230° C. and the mould is oven heated to 120° C. for one hour prior to injection moulding. Approximately 5 g of the material is placed in the mixing chamber and heated for 4 to 5 minutes. A small shot is taken from the CS-183 MMX Minimax moulder prior to placing the mould in position. Six tensile bars with the dimensions 18 mm by 5 mm by 0.85 mm are produced for each of the 5 g material.

Tensile testing is performed according to ASTM D 638 with a Rheometrics mini material tensile tester [Minimat 2000®] equipped with a 1000 N load cell (40 mm/min). The results are summarized in Table 7.

TABLE 7

| Example | Dispersing agent | d-001 (Å)[c] | Normalized Modulus of Elasticity[d] | Elongation at break (%)[e] |
|---|---|---|---|---|
| 7a[a] | none | 10 | 1.12 | 0.97 |
| 7b[b] | PODA (3a) | 12 | 1.20 | 1.12 |
| 7c[b] | PODA-b-VP (3b) | 12 | 1.24 | 1.15 |
| 7d[b] | PODA-b-PEGMEA (3c) | 17 | 1.18 | 1.22 |
| 7e[b] | PODA-b-HEA (3d) | 12 | 1.23 | 0.82 |

[a] Comparative Example.
[b] Example according to the invention (number in parentheses).
[c] Interlayer distance determined by X-ray diffraction.
[d] Normalized modulus of elasticity relative to polypropylene processed under similar conditions (=1.0).
[e] Normalized elongation at break relative to polypropylene processed under similar conditions (=1.0).

The X-ray diffraction (XRD) spectra show that all acrylic copolymers according to Table 7 intercalate the used clay in the direct melt blending experiments in the batch mixer. This is demonstrated by an increase in d-spacing of from 10 Å (comparative Example 7a) to 17 Å (Example 7d according to the invention). The elasticity modulus of samples is enhanced by 18-24% with respect to polypropylene without dispersing agent. Surprisingly, the elongation at break is also enhanced by 12-30% (except PODA-b-PHEA).

EXAMPLE 8

Preparation of Polypropylene Nanocomposites in a Batch Mixer Based on Unmodified Sodium Montmorillonite The polypropylene nanocomposites are prepared in analogy to Example 7 with the polypropylene Basell HP400N® instead of Basell KY 6100®. The results are summarized in Table 8.

TABLE 8

| Example | Dispersing agent | Normalized Modulus of Elasticity[d] |
|---|---|---|
| 8a[a] | none | 1.20 |
| 8b[b] | PODA-b-DMAEA (3e) | 1.39 |
| 8c[b] | PODA-co-EGMEA (1b) | 1.36 |
| 8d[b] | PODA-co-MAH (1a) | 1.32 |
| 8e[b] | PODA-co-DMAEA (1c) | 1.22 |
| 8f[b] | PODA-co-DMAEA (2a) | 1.33 |
| 8g[b] | PODA-co-BA-co-DMAEA (1d) | 1.27 |
| 8h[b] | PODA-co-BA-co-MAH (1e) | 1.26 |
| 8i[b] | PODA-co-DEGEEA (1f) | 1.37 |
| 8j[b] | PODA-co-EGMEA (1g) | 1.33 |
| 8k[b] | PODA-co-EGMEA (2b) | 1.47 |

[a] Comparative Example.
[b] Example according to the invention (number in parentheses).
[d] Normalized modulus of elasticity relative to competitive polypropylene nanocomposite (8a) processed under similar conditions (=1.0).

The elasticity modulus of samples is enhanced by 26 to 47% with respect to polypropylene without dispersing agent.

EXAMPLE 9

Preparation of Polypropylene Nanocomposites in a Batch Mixer Based on Amine Modified Montmorillonite The polypropylene nanocomposites are prepared in analogy to Example 7 with the amine modified montmorillonite Nanofil 15® obtained from Sued Chemie instead of montmorillonite clay [Cloisite (Na$^+$)® obtained from Southern Clay Industries]. The results are summarized in Table 9.

TABLE 9

| Example | Dispersing agent | d-001 in Å[c] |
|---|---|---|
| 9a[a] | none | 28.5 |
| 9b[b] | PODA-b-AN (3g) | 35.3 |
| 9c[b] | PODA-b-NVP (4b) | 33.3 |
| 9d[b] | PODA-b-HEA (3f) | 35.3 |

TABLE 9-continued

| Example | Dispersing agent | d-001 in Å[c] |
|---|---|---|
| 9e[b] | PODA-b-VP (3h) | 38.4 |
| 9f[b] | PODA-b-PEGMEA (3i) | 37.6 |
| 9g[b] | PODA-b-PEO750 (5a) | 34.6 |
| 9h[b] | PODA-b-PEO1000 (5b) | 34.6 |
| 9i[b] | PODA-b-VBTEAC (6a) | 42.0 |
| 9j[b] | PODA-b-VBTBPC (6b) | 32.0 |
| 9k[b] | PODA-b-VBDHEA (6c) | 35.0 |

Explanation of footnotes a), b), c) see end of Table 7.

The X-ray diffraction (XRD) spectra show that all acrylic polymers according to Table 4 intercalate the used day in the direct melt blending experiments in the batch mixer. This is shown by the d-spacing of 32-42 Å.

EXAMPLE 10

Preparation of Polypropylene Nanocomposites in a Batch Mixer Based on Unmodified Sodium Montmorillonite The polypropylene nanocomposites are prepared in analogy to Example 7 with the polypropylene Basell HP400N® instead of Basell KY 6100®. However, the small scale injection moulding is performed with a CS-183MMX Minimax moulder. The mixing chamber is preheated to 250° C. and the mould is oven heated to 120° C. for one hour prior to injection moulding. Approximately 5 g of the material is placed in the mixing chamber and heated for 4 to 5 minutes. A small shot is taken from the CS-183MMX Minimax moulder prior to placing the mould in position. Six tensile bars with the dimensions of central section 35 mm by 5 mm by 1 mm (overall length 58 mm) are produced for each of the 5 g material.

Tensile testing is performed with a Instron tensile tester equipped with a 5000 N load cell (1 mm/min) and a 25 mm extensometer. The results are summarized in Table 10.

TABLE 10

| Example | Dispersing agent | Normalized Modulus of Elasticity[d] |
|---|---|---|
| 10a[a] | none | 1.20 |
| 10b[b] | PODA-co-DEGEEA (1f) | 1.44 |
| 10c[b] | PODA-co-BA-co-DMAEA (1d) | 1.34 |
| 10d[b] | PODA-co-BA-co-MAH (1e) | 1.32 |
| 10e[b] | PODA-co-PEGMEA (1g) | 1.40 |
| 10f[b] | PODA-co-PEGMEA (2b) | 1.55 |
| 10g[b] | PODA-co-DMAEA (1c) | 1.28 |
| 10h[b] | PODA-co-DMAEA (2d) | 1.40 |

Explanation of footnotes a), b) and d) see end of Table 8.

The elasticity modulus of samples is enhanced by 28 to 55% with respect to polypropylene without dispersing agent.

EXAMPLE 11

Preparation of Polypropylene Nanocomposites in a Twin Screw Extruder

Processing is carried out with a Japan Steel Works 30 mm diameter twin screw extruder of L/D ratio 42 (JSW TEX 30) that comprises ten temperature controlled barrel sections each with L/D of 3.5, three unheated sampling zones with L/D 1.167, and a cooled feed block with L/D 3.5. The screw configuration consists of a combination of mixing, kneading and conveying elements familiar to those skilled in the art. Materials are fed into the extruder via a JSW TTF20 gravimetric feeder (Feed 1) and a K-Tron KQX gravimetric feeder (Feed 2). The JSW TEX 30 is operated in a co-rotating (intermeshing self wiping) mode with throughput of 10 kg/hr and a screw speed of 200 rpm. Vacuum venting is applied to the final barrel section. The extrudate is cooled in a water filled strand bath and pelletized.

In a first step a 10 wt % clay masterbatch is prepared. Feed 1 comprises a dry blend of polypropylene [Basell HP400N®] and a stabilizer which is composed of 0.1 wt % of Irganox 1010® (pentaerythritol tetrakis[3-(3,5-di-tert-butyl-4-hydroxyphenyl)propionate]) and 0.1 wt % of Irgafos 168® (tris(2,4-di-tert-butylphenyl)phosphite). Feed 2 comprises a blend of the clay [Cloisite (Na+)®] obtained from Southern Clay Industries] and the non-ionic surfactant in the ratio defined in Table 11. All barrel sections are heated to 170° C.

In the second step the masterbatch is let down to the required clay level (see Table 4) by blending the masterbatch (Feed 2) with further polypropylene plus stabilizer (Feed 1). The first barrel section is heated at 160° C. the remaining barrel sections are heated at 200° C.

Injection moulding of the extruded samples are preformed with a Cincinnati Milacron VS55 28 mm diameter injection moulding machine comprising four temperature controlled sections of L/D 23/1 heated at 215-230° C. and a mould temperature of 40° C. The machine is operated at a clamp force of 50 tons and at a maximum injection pressure of 2005 bar.

Tensile testing to obtain tensile modulus and tensile strength is performed according to ISO 521 using an Instron 5500R material tensile tester equipped with a 5 kN load cell and a 50 mm extensometer. The strain rate is 1 mm/min. Properties are normalised tensile properties vs polypropylene=1.0. Elongation at break is measured with a strain rate of 50 mm/min.

TABLE 11

| Example | Additive (2.5 wt %) | Tensile Modulus[d] | Elongation at break[e] | Tensile Strength[f] |
|---|---|---|---|---|
| 11a[a] | no additive | 1.17 | 1.0 | 1.06 |
| 11b[b] | PODA-co-DEGEEA (1f) | 1.22 | 3.1 | 1.11 |
| 11c[b] | PODA-co-PEGMEA (2b) | 1.26 | 1.3 | 1.11 |
| 11d[b] | PODA-co-DMAEA (2d) | 1.20 | 4.2 | 1.07 |
| 11e[b] | PODA-co-DMAEA (1c) | 1.22 | 3.4 | 1.07 |

[a]Comparative Example.
[b]Example according to the invention (number in parentheses).
[d]Normalized modulus of elasticity relative to competitive polypropylene nanocomposite (11a) processed under similar conditions (=1.0).
[e]Normalized elongation at break relative to polypropylene processed under similar conditions (=1.0).
[f]Normalized tensile strength relative to polypropylene processed under similar conditions (=1.0).

EXAMPLE 12

Polypropylene Nanocomposites in a Twin Screw Extruder

The samples are prepared using process conditions similar to Example 11 with the additive premixed with clay in (1:5 ratio) at 80° C. A 10% clay masterbatch is prepared in step 1.

TABLE 12

| Example | Additive (wt %) | Tensile Modulus[d] | Elong. at break[e] | Tensile Strength[f] | Impact Strength[g] |
|---|---|---|---|---|---|
| 12a[a] | no additive | 1.26 | 1.0 | 1.05 | 1.1 |
| 12b[b] | 1 wt % PODA-co-MAH 3:1 (1h) | 1.18 | 3.6 | 1.03 | 1.3 |
| 12c[b] | 1 wt % PODA-co-MAH 5:1 (1i) | 1.22 | 1.6 | 1.04 | 1.4 |
| 12d[b] | 1 wt % PODA-co-MAH (2j) | 1.27 | 2.8 | 1.00 | 1.1 |
| 12e[b] | 1 wt % PODA-co-NVP (2c) | 1.25 | 3.0 | 1.02 | 1.1 |
| 12f[b] | 1 wt % PODA-co-PEGMEA (2b) | 1.24 | 0.8 | 0.98 | 1.0 |
| 12g[b] | 2.5 wt % PODA-co-MAH (2j) | 1.18 | 3.5 | 0.99 | 1.1 |

[a] Comparative Example.
[b] Example according to the invention (number in parentheses).
[d] Normalized modulus of elasticity relative to competitive polypropylene nanocomposite (12a) processed under similar conditions (=1.0).
[e] Normalized elongation at break relative to polypropylene processed under similar conditions (=1.0).
[f] Normalized tensile strength relative to polypropylene processed under similar conditions (=1.0).
[g] Normalized tensile impact strength relative to polypropylene processed under similar conditions (=1.0).

Samples with additives show Improvements in tensile modulus and impact strength over PP and significant improvement in elongation at break over the clay alone composite.

EXAMPLE 13

Polypropylene Nanocomposites in a Twin Screw Extruder

The samples are prepared using process conditions similar to Example 11 with the additive premixed with clay in (1:5 ratio) at 80° C. A 10% clay masterbatch is prepared in step 1 two different clays are used Cloisite (Na+)® obtained from Southern Clay Industries and Somasif ME100® obtained from Co-op Chemical Company Japan.

Samples with additives show Improvements in tensile strength and modulus over PP and marked improvement in elongation at break over clay alone composites.

EXAMPLE 14

Polypropylene Nanocomposites in a Twin Screw Extruder

The samples were prepared using process conditions similar to Example 11 with the additive premixed with clay in (1:5 ratio) at ambient temperature. A 10% clay masterbatch is prepared in step 1.

TABLE 13

| Example | 5% Clay | Additive (1 wt %) | Tens. Mod.[d] | Elong. at break[e] | Tensile Strength[f] |
|---|---|---|---|---|---|
| 13a[a] | Cloisite Na+ | No additive | 1.17 | 1.0 | 1.05 |
| 13b[b] | Cloisite Na+ | PODA-co-MMA-co-MAH (2f) | 1.12 | 6.5 | 1.00 |
| 13c[b] | Somasif ME100 | No additive | 1.16 | 1.6 | 1.04 |
| 13d[b] | Somasif ME100 | PODA-co-MMA-co-MAH (2f) | 1.12 | 3.9 | 1.01 |

[a] Comparative Example.
[b] Example according to the invention (number in parentheses).
[d] Normalized modulus of elasticity relative to competitive polypropylene nanocomposite (13a) processed under similar conditions (=1.0).
[e] Normalized elongation at break relative to polypropylene processed under similar conditions (=1.0).
[f] Normalized tensile strength relative to polypropylene processed under similar conditions (=1.0).

TABLE 14

| Examp. | 5% Clay | Additive (1 wt %) | Tens. Mod.[d] | Elong. at break[e] | Tensile Strength[f] |
|---|---|---|---|---|---|
| 14a[a] | No clay | No additive | 1.0 | — | 1.0 |
| 14b[b] | Cloisite Na+ | No additive | 1.14 | 1.0 | 1.01 |
| 14c[b] | Cloisite Na+ | PODA (4a) | 1.14 | 2.8 | 0.98 |
| 14d[b] | Cloisite Na+ | PODA-co-PDMAEA (2d) | 1.13 | 5.7 | 0.98 |
| 14e[b] | Cloisite Na+ | PODA-b-PDMAEA 5000 (4e) | 1.13 | 3.2 | 0.96 |
| 14f[b] | Cloisite Na+ | PODA-co-PDMAEA 15000 (4d) | 1.13 | 3.6 | 0.96 |

[a] Comparative Example.
[b] Example according to the invention (number in parentheses).
[d] Normalized modulus of elasticity relative to competitive polypropylene nanocomposite (14b) processed under similar conditions (=1.0).
[e] Normalized elongation at break relative to polypropylene processed under similar conditions (=1.0).
[f] Normalized tensile strength relative to polypropylene processed under similar conditions (=1.0).

Samples with additives show Improvements in tensile strength and modulus over PP and marked improvement in elongation at break over clay alone composites. PODA by itself gives good tensile property improvements.

EXAMPLE 15

Polypropylene Nanocomposites in a Twin Screw Extruder

The samples are prepared using process conditions similar to Example 11 with the additive premixed with clay in (1:5 ratio) at ambient temperature. A 10% clay masterbatch is prepared in step 1.

Samples with additives show Improvements in tensile strength and modulus over PP and marked improvement in elongation at break over clay alone composites. Significant improvements over PP are seen with very low day additive levels.

EXAMPLE 16

Polypropylene Nanocomposites in a Twin Screw Extruder

The samples are prepared using process conditions similar to Example 11 with the additive premixed with clay in (1:5 ratio) at ambient temperature. A 10% clay masterbatch is prepared in step 1.

TABLE 15

| Examp. | Clay | Additive | T.M.[d] | E at b.[e] | T.S.[f] |
|---|---|---|---|---|---|
| 15a[a] | No clay | No additive | 1.0 | — | 1.0 |
| 15b[b] | 5% Cloisite Na+ | No additive | 1.24 | 1.0 | 1.07 |
| 15c[b] | 1% Cloisite Na+ | 0.2 wt % PODA-co-MAH (2d) | 1.11 | 13.9 | 1.04 |
| 15d[b] | 3% Cloisite Na+ | .6% PODA-co-MAH (2d) | 1.24 | 7.1 | 1.06 |
| 15e[b] | 5% Cloisite Na+ | 1% PODA-co-MAH (2d) | 1.25 | 5.2 | 1.06 |
| 15f[b] | 5% Cloisite Na+ | 1.25% PODA-co-MAH (2d) | 1.24 | 3.7 | 1.04 |
| 15g[b] | 5% Cloisite Na+ | 0.5% PODA-co-MAH (2d) | 1.23 | 5.6 | 1.05 |
| 15h[b] | 1% Cloisite Na+ | 0.2% PODA-co-MAH (1h) | 1.11 | 15.1 | 1.02 |
| 15i[b] | 3% Cloisite Na+ | 0.6% PODA-co-MAH (1h) | 1.16 | 11.7 | 1.03 |
| 15j[b] | 5% Cloisite Na+ | 1% PODA-co-MAH (1h) | 1.20 | 4.0 | 1.03 |
| 15k[b] | 5% Cloisite Na+ | 1.25% PODA-co-MAH (1h) | 1.18 | 5.7 | 1.02 |
| 15l[b] | 5% Cloisite Na+ | 0.5% PODA-co-MAH (1h) | 1.23 | 5.6 | 1.05 |
| 15m[b] | 1% Cloisite Na+ | 0.2 wt % PODA-co-NVP (2c) | 1.11 | 17.7 | 1.02 |
| 15n[b] | 3% Cloisite Na+ | .6% PODA-co-NVP (2c) | 1.16 | 8.4 | 1.01 |
| 15o[b] | 5% Cloisite Na+ | 1% PODA-co-NVP (2c) | 1.22 | 5.6 | 1.03 |
| 15p[b] | 5% Cloisite Na+ | 1.25% PODA-co-NVP (2c) | 1.17 | 6.9 | 0.99 |
| 15q[b] | 5% Cloisite Na+ | 0.5% PODA-co-NVP (2c) | 1.15 | 7.2 | 1.01 |

[a] Comparative Example.
[b] Example according to the invention (number in parentheses).
[d] Normalized modulus of elasticity relative to competitive polypropylene nanocomposite (15b) processed under similar conditions (=1.0).
[e] Normalized elongation at break relative to polypropylene processed under similar conditions (=1.0).
[f] Normalized tensile strength relative to polypropylene processed under similar conditions (=1.0).

TABLE 16

| Examp. | Clay | Additive (wt %) | T.M.[d] | E. at b.[e] | T.S.[f] |
|---|---|---|---|---|---|
| 16a[a] | No clay | No additive | 1.0 | — | 1.0 |
| 16b[b] | 5% Cloisite Na+ | No additive | 1.22 | 1.0 | 1.04 |
| 16c[b] | 5% Cloisite Na+ | 1% Tegomer DA100N[h] | 1.23 | 2.6 | 1.04 |
| 16d[b] | 5% Cloisite Na+ | 1% PODA-co-NVP (1k) | 1.20 | 2.4 | 1.02 |
| 16e[b] | 5% Cloisite Na+ | 1% PODA-co-NVP (1I) | 1.24 | 3.6 | 1.02 |
| 16f[b] | 5% Cloisite Na+ | 1% PODA-co-NVP (1n) | 1.24 | 3.2 | 1.02 |
| 16g[b] | 3% Cloisite Na+ | 0.6% PODA-co-NVP (1n) | 1.13 | 4.4 | 1.00 |
| 16h[b] | 1% Cloisite Na+ | 0.2% PODA-co-NVP (1n) | 1.06 | 12.6 | 0.99 |
| 16i[b] | 5% Cloisite Na+ | 0.5% PODA-co-NVP (1n) | 1.18 | 4.0 | 1.00 |
| 16j[b] | 5% Cloisite Na+ | 1.25% PODA-co-NVP (1l) | 1.17 | 1.1 | 0.98 |
| 16k[b] | 5% Cloisite Na+ | 1% PODMA-co-NVP (1m) | 1.20 | 3.2 | 1.02 |
| 16l[b] | 5% Cloisite Na+ | 1% PODMA-co-MAH (1o) | 1.22 | 5.3 | 1.02 |
| 16m[b] | 5% Somasif ME100 | 1% PODA-co-MAH (1i) | 1.24 | 6.7 | 1.02 |

[a] Comparative Example.
[b] Example according to the invention (number in parentheses).
[d] Normalized modulus of elasticity relative to competitive polypropylene nanocomposite (14b) processed under similar conditions (= 1.0).
[e] Normalized elongation at break relative to polypropylene processed under similar conditions (= 1.0)
[f] Normalized tensile strength relative to polypropylene processed under similar conditions (= 1.0).
[h] RTM product of Goldschmidt.

Samples with additives show Improvements in tensile strength and modulus over PP and marked improvement in elongation at break over clay alone composites. Significant improvements over PP are seen with very low clay additive levels.

EXAMPLE 17

Polypropylene Nanocomposites in a Twin Screw Extruder

The samples are prepared using process conditions similar to Example 11 with the additive premixed with day in (1:5 ratio) at ambient temperature. A 10% clay masterbatch is prepared in step 1.

TABLE 17

| Example | Clay (5 wt %) | Additive (1 wt %) | T.M.[d] | E. at b[e] | T.S.[f] |
|---|---|---|---|---|---|
| 17a[a] | No clay | No additive | 1.0 | — | 1.0 |
| 17b[b] | Cloisite Na+ | No additive | 1.18 | 1.0 | 1.02 |
| 17c[b] | Cloisite Na+ | PODA-co-GA (1q) | 1.12 | 3.2 | 0.99 |
| 17d[b] | Cloisite Na+ | PODA-co-MEP (2m) | 1.14 | 4.4 | 1.01 |
| 17e[b] | Cloisite Na+ | PLA-co-MAH (2n) | 1.15 | 3.7 | 1.00 |
| 17f[b] | Cloisite Na+ | PODA-co-GMA (2n) | 1.15 | 3.7 | 1.01 |

[a] Comparative Example.
[b] Example according to the invention (number in parentheses).
[d] Normalized modulus of elasticity relative to competitive polypropylene nanocomposite (17b) processed under similar conditions (= 1.0).
[e] Normalized elongation at break relative to polypropylene processed under similar conditions (= 1.0).
[f] Normalized tensile strength relative to polypropylene processed under similar conditions (= 1.0).

EXAMPLE 18

Polypropylene Nanocomposites in a Twin Screw Extruder

The samples are prepared using process conditions similar to Example 11 with the additive premixed with clay in (1:5 ratio) at ambient temperature. A 10% clay masterbatch is prepared in step 1.

TABLE 18

| Example | Clay (5 wt %) | Additive (wt %) | T.M.[d] | E. at b.[e] | T.S.[f] |
|---|---|---|---|---|---|
| 18a[a] | No clay[d] | No additive | 1.0 | — | 1.0 |
| 18b[b] | Cloisite Na+[d] | No additive | 1.18 | 1.0 | 1.02 |
| 18c[b] | Cloisite Na+[e] | 1% PODA-co-HAH (2e) 7.5% Polybond 3200 | 1.28 | 2.1 | 1.09 |
| 18d[b] | Cloisite 20A[d] | no additive | 1.20 | 1.2 | 1.04 |
| 18e[b] | Cloisite 20A[d] | 7.5% Polybond 3200 | 1.41 | 0.6 | 1.14 |

[a] Comparative Example.
[b] Example according to the invention (number in parentheses).
[d] Normalized modulus of elasticity relative to competitive polypropylene nanocomposite (18b) processed under similar conditions (= 1.0).
[e] Normalized elongation at break relative to polypropylene processed under similar conditions (= 1.0).
[f] Normalized tensile strength relative to polypropylene processed under similar conditions (= 1.0).

The Examples according to the invention show a significant imrpovement in the elongation at break.

EXAMPLE 19

Thermal Stability Under Air and Nitrogen of Polypropylene Nanocomposites

The following data demonstrate that samples prepared with a copolymer additives according to the invention have significantly greater thermal stability under air than either polypropylene or polypropylene plus unmodified day with the temperature for maximum weight loss approx 30° C. higher.

The samples (~10 mg, cryoground powder) are heated from 50 to 500° C. at 10° C./min in a Mettler thermobalance T6A/SDTA851 equipped with a T50 801 sample robot under air or under nitrogen atmosphere. Onset and end temperatures are calculated by the tangent method. The results are summarized in Table 19.

TABLE 19

Data from thermogravimetric analysis under air of nanocomposites with 5 wt % Cloisite Na+

| Example | Material | $T_{onset}$ °C. | $T_{end}$ °C. | $T_{max}$ °C. | Residual weight, % |
|---|---|---|---|---|---|
| 19a[a] | Polypropylene | 280 | 390 | 380 | 0.6 |
| 19b[a] | No copolymer | 269 | 388 | 381 | 6.1 |
| 19c[b] | 1% POOA-co-MAH 1j) | 287 | 422 | 416 | 6.2 |
| 19d[b] | 1% PODA-co-NVP 1k) | 285 | 419 | 413 | 5.6 |

[a] Comparative Example.
[b] Example according to the invention.

EXAMPLE 20

Plate-and-Plate Oscillatory Rheology

The viscosity of the samples is similar to polypropylene (see Table 20). Conventional organic modified clays and derived nanocomposites have significantly increased viscosity with respect to polypropylene. Clay alone composites have a reduced viscosity (see comparative Example in Table 20). The nanocomposites of the present invention are more readily processed than conventional nanocomposites based on organic modified clays.

The melt behavior of the blends and neat components in the low shear rate range is studied using a dynamic rheometer ARES (Advanced Rheometric Expansion Systems). Measurements are performed in the plate-plate configuration with a gap of 1.5 to 2.0 mm. Specimens are disks with diameter of 25 mm cut from the approximately 2 mm thick sheets prepared by compression molding. Frequency sweep experiments are performed on each of the materials over a frequency range of 0.1 to 100 rad/s, with data collected at five points per decade. Temperature of the experiments is set at 200° C., corresponding to the temperature of the composite preparation. The results are summarized in Table 20.

TABLE 20

| | | | Complex Viscosity, Pa · s @ 200° C. for frequency [rad/sec] | | | |
|---|---|---|---|---|---|---|
| Example | Cloisite Na+ | Copolymer | 0.1 | 1.0 | 10 | 100 |
| 20a[a] | none | none | 3160 | 2340 | 1171 | 395 |
| 20b[a] | 5% | none | 2986 | 1944 | 939 | 312 |
| 20c[b] | 5% | PODA-co-MAH (1h) | 3181 | 2317 | 1175 | 403 |
| 20d[b] | 5% | PODA-co-MAH (1i) | 3276 | 2353 | 1181 | 403 |
| 20e[b] | 5% | PODA-co-MAH (2j) | 3191 | 2285 | 1145 | 390 |

[a] Comparative Example.
[b] Example according to the invention.

What is claimed is:

1. A composition comprising
   (a) a synthetic polymer,
   (b) a natural or synthetic phyllosilicate filler or a mixture of such phyllosilicate fillers, and
   (c) as dispersing agent an acrylic copolymer containing an alkyl acrylate or methacrylate comprising at least 8 methylene groups in the side chain.

2. A composition according to claim 1, wherein component (c) is a statistical, block or comb copolymer having at least one hydrophilic and at least one hydrophobic segment which is based on an alkyl acrylate according to claim 1.

3. A composition according to claim 1, wherein component (a) is a polyolefin.

4. A composition according to claim 1, wherein component (b) is a nanoparticulate filler.

5. A composition according to claim 1, wherein component (b) is a nanoparticulate filler which is not organically modified.

6. A composition according to claim 1, wherein component (b) is a layered silicate clay.

7. A composition according to claim 1, wherein component (b) is a montmorillonite, bentonite, beidelite, mica, hectorite, saponite, nontronite, sauconite, vermiculite, ledikite, magadite, kenyaite, stevensite, volkonskoite, hydrotalcite, illite, kaolinite, wollastonite, attapulgite, talc or silica or a mixture thereof.

8. A composition according to claim 1, wherein the long chain alkyl meth(acrylate) segment in component (c) contains a $C_{12}$-$C_{32}$ alkyl meth(acrylate).

9. A composition according to claim 1, wherein component (c) is ) is poly(octadecyl acry-late)-co-(maleic anhydride), poly(octadecyl acrylate)-co-(poly(ethylene glycol) methyl ether acrylate), poly(octadecyl acrylate)-co-(diethylene glycol ethyl ether acrylate), poly(octadecyl acrylate)-co-(N-vinylpyrrolidone), poly(octadecyl methacrylate)-co-(N-vinylpyrrolidone), poly(octadecyl methacrylate)-co-(maleic anhyd ride), poly(octadecyl acrylate)-co-(glycidyl acrylate), poly(octadecyl acrylate)-co-(2-dimethylaminoethyl acrylate), poly(octadecyl acrylate)-co-(poly(ethylene glycol) methyl ether acrylate), poly(octadecyl acrylate)-co-(d iethylene g lycol ethyl ether acrylate), poly(octadecyl acrylate)-co-(methacrylolyoxyethyl phosphate), poly(lauryi acrylate)-co-(maleic anhydride), poly(octadecyl acrylate)-co-(glycidyl methacrylate) or poly(octadecyl acrylate)-co-(methacrylic acid).

10. A composition according to claim 1, wherein component (b) is present in an amount of from 0.1 to 40%, based on the weight of component (a).

11. A composition according to claim 1, wherein component (c) is present in an amount of from 0.1 to 20%, based on the weight of component (a).

12. A composition according to claim 1, comprising in addition, besides components (a), (b) and (c), further additives.

13. A composition according to claim 12, comprising as further additives phenolic antioxidants, light-stabilizers, processing stabilizers, solvents, pigments, dyes, plasticizers, compatibilizers, toughening agents, thixotropic agents and/or metal deactivators.

14. A composition according to claim 1 in the form of a masterbatch or concentrate comprising component (a) in an amount of from 5 to 90%, component (b) in an amount of from 5 to 80%, and component (c) in an amount of from 1 to 50% by weight.

15. A process for the preparation of a composition according to claim 1 which process comprises melt mixing a mixture of components (a), (b) and (c).

16. A process according to claim 15, wherein the melt mixing occurs between 120 and 290° C.

17. A composition obtained by the process according to claim 15.

18. An article comprising the composition according to claim 1.

* * * * *

UNITED STATES PATENT AND TRADEMARK OFFICE
CERTIFICATE OF CORRECTION

PATENT NO. : 7,288,585 B2  Page 1 of 1
APPLICATION NO. : 10/561297
DATED : October 30, 2007
INVENTOR(S) : Graeme Moad et al.

It is certified that error appears in the above-identified patent and that said Letters Patent is hereby corrected as shown below:

Title page

Item (73) should read:

-- (73) Assignee: Polymers Australia Pty. Limited
                  Victoria, Australia --.

Signed and Sealed this

Twenty-first Day of October, 2008

JON W. DUDAS
*Director of the United States Patent and Trademark Office*